US011886136B2

(12) United States Patent
Ota

(10) Patent No.: US 11,886,136 B2
(45) Date of Patent: Jan. 30, 2024

(54) IMAGE FORMING APPARATUS INCLUDING REGULATING PORTION CONFIGURED TO CONTACT SHEET THAT IS CONVEYED ON CONVEYANCE SURFACE OF BELT

(71) Applicant: BROTHER KOGYO KABUSHIKI KAISHA, Nagoya (JP)

(72) Inventor: Shuji Ota, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/591,339

(22) Filed: Feb. 2, 2022

(65) Prior Publication Data

US 2022/0260943 A1 Aug. 18, 2022

(30) Foreign Application Priority Data

Feb. 12, 2021 (JP) ................................. 2021-020568

(51) Int. Cl.
*G03G 15/00* (2006.01)
*G03G 15/20* (2006.01)

(52) U.S. Cl.
CPC ..... *G03G 15/2028* (2013.01); *G03G 15/2064* (2013.01); *G03G 15/657* (2013.01); *G03G 2215/00413* (2013.01); *G03G 2215/00675* (2013.01)

(58) Field of Classification Search
CPC ........... G03G 15/2028; G03G 15/2064; G03G 15/657; G03G 2215/00413; G03G 2215/00675; G03G 15/0194; G03G 2221/1869; G03G 2221/1684
See application file for complete search history.

(56) References Cited

U.S. PATENT DOCUMENTS

| | | | | |
|---|---|---|---|---|
| 2002/0061206 A1* | 5/2002 | Enomoto | G03G 15/6502 | 399/124 |
| 2006/0029423 A1* | 2/2006 | Shiraki | G03G 15/0887 | 399/113 |
| 2009/0010696 A1* | 1/2009 | Yang | G03G 21/1676 | 399/395 |

(Continued)

FOREIGN PATENT DOCUMENTS

| | | |
|---|---|---|
| JP | 8-44230 A | 2/1996 |
| JP | 2003-29481 A | 1/2003 |

(Continued)

*Primary Examiner* — Arlene Heredia
*Assistant Examiner* — Laura Roth
(74) *Attorney, Agent, or Firm* — Merchant & Gould P.C.

(57) ABSTRACT

A drum frame includes a first regulating portion located between a transfer nip and a downstream end of a conveyance surface in a conveyance direction. The first regulating portion faces the conveyance surface from above the conveyance surface. The first regulating portion includes a first horizontal portion and a pair of first inclined portions. The first horizontal portion extends in a width direction perpendicular to the conveyance direction. The pair of first inclined portions extends from both ends of the first horizontal portion in the width direction. Each first inclined portion has one end adjacent to the first horizontal portion and an other end away from the one end in the width direction. Each first inclined portion is inclined to be closer to an endless belt from the one end toward the other end.

17 Claims, 9 Drawing Sheets

(56) References Cited

U.S. PATENT DOCUMENTS

| | | | | |
|---|---|---|---|---|
| 2009/0142111 | A1* | 6/2009 | Hashimoto ........ | G03G 15/2028 399/322 |
| 2011/0070002 | A1* | 3/2011 | Choi .................... | G03G 15/657 399/322 |

FOREIGN PATENT DOCUMENTS

| | | | |
|---|---|---|---|
| JP | 2009-128505 | A | 6/2011 |
| JP | 2017-67961 | A | 4/2017 |

* cited by examiner

IMAGE FORMING APPARATUS INCLUDING REGULATING PORTION CONFIGURED TO CONTACT SHEET THAT IS CONVEYED ON CONVEYANCE SURFACE OF BELT

CROSS REFERENCE TO RELATED APPLICATIONS

This application claims priority from Japanese Patent Application No. 2021-020568 filed Feb. 12, 2021. The entire content of the priority application is incorporated herein by reference.

BACKGROUND

An image forming apparatus having a photosensitive drum and a transfer roller is known. The image forming apparatus includes a process unit for transferring a developer image to a sheet, and a fixing device having a heat roller and a pressure roller for fixing the developer image to the sheet.

SUMMARY

According to one aspect, this specification discloses an image forming apparatus. The image forming apparatus includes a transfer unit and a process unit. The transfer unit includes a plurality of rollers and an endless belt. The endless belt is stretched between the plurality of rollers and is configured to convey a sheet in a conveyance direction. An upper surface of the endless belt serves as a conveyance surface. The process unit includes a photosensitive drum and a drum frame. The photosensitive drum is provided above the endless belt. The process unit is configured to form an image on the sheet at a transfer nip between the photosensitive drum and the endless belt. The drum frame supports the photosensitive drum. The drum frame includes a first regulating portion located between the transfer nip and a downstream end of the conveyance surface in the conveyance direction. The first regulating portion faces the conveyance surface from above the conveyance surface. The first regulating portion is configured to contact the sheet that is conveyed on the conveyance surface. The first regulating portion includes a first horizontal portion and a pair of first inclined portions. The first horizontal portion extends in a width direction perpendicular to the conveyance direction. The pair of first inclined portions extends from both ends of the first horizontal portion in the width direction. Each of the pair of first inclined portions has one end adjacent to the first horizontal portion and an other end away from the one end in the width direction. Each of the pair of first inclined portions is inclined to be closer to the endless belt from the one end toward the other end. The pair of first inclined portions is configured to contact both ends of the sheet in the width direction.

According to another aspect, this specification also discloses an image forming apparatus. The image forming apparatus includes a plurality of rollers, an endless belt, a photosensitive drum, a transfer roller, and a drum frame. The endless belt is stretched between the plurality of rollers and is configured to convey a sheet in a conveyance direction. An upper surface of the endless belt serves as a conveyance surface. The photosensitive drum is provided above the endless belt. The transfer roller is configured to form an image on the sheet at a transfer nip between the photosensitive drum and the endless belt. The drum frame supports the photosensitive drum. The drum frame includes a first guide located between the transfer nip and a downstream end of the conveyance surface in the conveyance direction. The first guide faces the conveyance surface from above the conveyance surface. The first guide is configured to contact the sheet that is conveyed on the conveyance surface. The first guide includes a first horizontal surface and a pair of first inclined surfaces. The first horizontal surface extends in a width direction perpendicular to the conveyance direction. The pair of first inclined surfaces extends from both ends of the first horizontal surface in the width direction. Each of the pair of first inclined surfaces has one end adjacent to the first horizontal surface and an other end away from the one end in the width direction. Each of the pair of first inclined surfaces is inclined to be closer to the endless belt from the one end toward the other end. The pair of first inclined surfaces is configured to contact both ends of the sheet in the width direction.

With this configuration, when the trailing end of the sheet is lifted from the conveyance surface, the pair of first inclined portions contacts both ends of the trailing end of the lifted sheet in the left-right direction and directly press the trailing end of the sheet. Thus, the lift of the trailing end of the sheet is suppressed and a separation discharge is effectively suppressed.

BRIEF DESCRIPTION OF THE DRAWINGS

Embodiments in accordance with this disclosure will be described in detail with reference to the following figures wherein.

DETAILED DESCRIPTION

Figure 1:
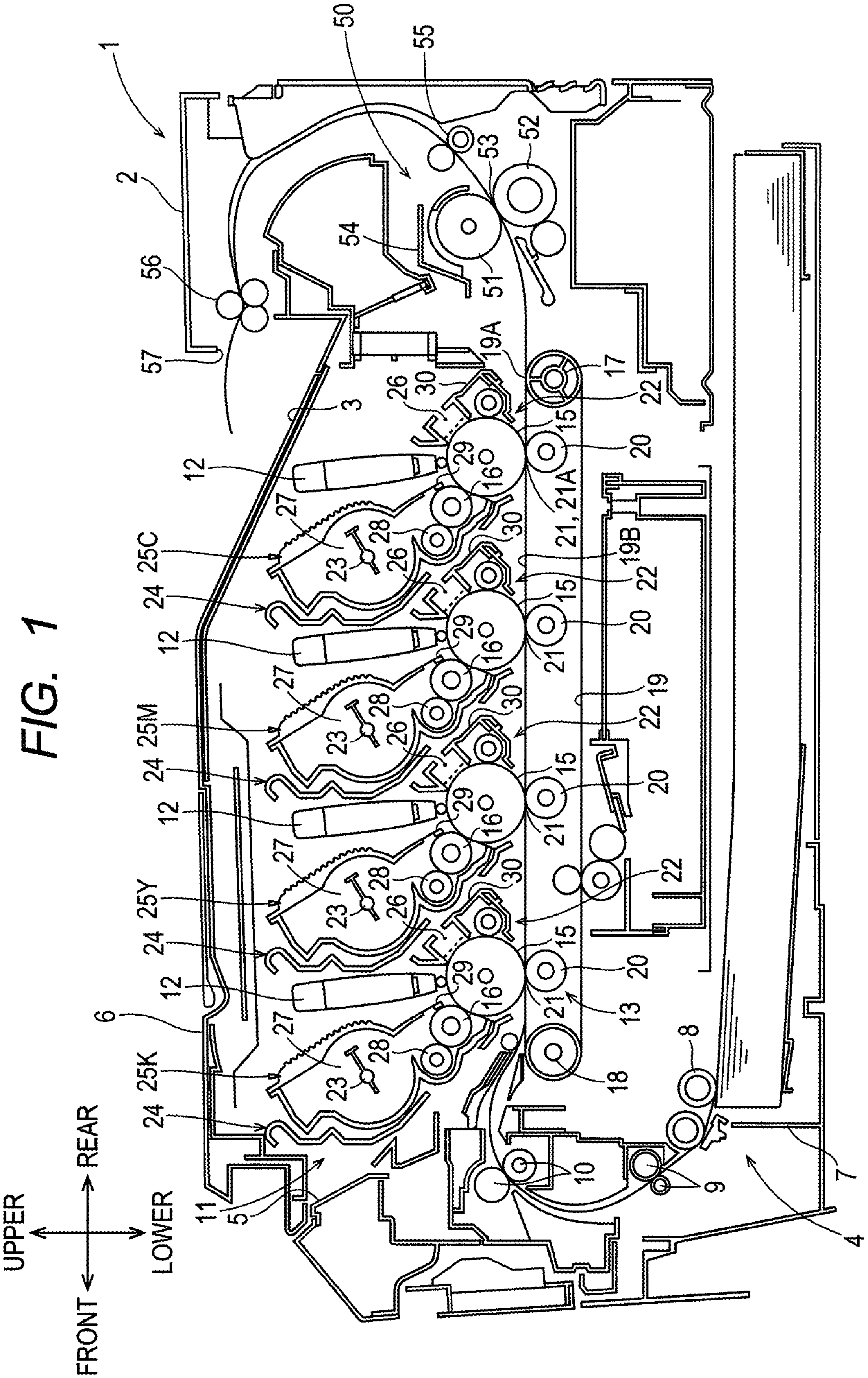
FIG. 1 is a schematic vertical cross-sectional view showing relevant parts of an image forming apparatus 1.

In the above-mentioned image forming apparatus, when a sheet is discharged from the process unit, the trailing end of the sheet in the conveyance direction may be suddenly displaced so as to be lifted upward. In this case, the image forming surface of the sheet may collide with the internal structure of the apparatus, and the developer image before fixing may be peeled off, which deteriorates the image quality.

In order to suppress the deterioration of image quality as described above, it is conceivable to provide an entrance conveyance guide near the entrance of the fixing device.

In the above configuration, an entrance conveyance guide member for guiding a recording medium to the fixing device is provided in the vicinity of the fixing device. The inlet conveyance guide member is formed of an upper member and a lower member having a particular gap. The gap is narrower at both ends than the center in the lengthwise direction. With this configuration, even if the trailing end of the recording medium is lifted, only the non-image area at both ends of the recording medium contacts the upper member and prevents the image from being rubbed, which suppresses the deterioration of the image quality.

However, in the image forming apparatus as described above, the surface of the endless belt is charged by applying a transfer bias between the photosensitive drum and the transfer roller, and the sheet electrically adheres to the charged surface and conveyed. Thus, when the sheet electrically adhering to the endless belt is lifted at a steep angle, a separation discharge occurs between the sheet and the endless belt, and static electricity disturbs developer before fixing, resulting in deterioration of image quality.

Thus, even if it is prevented that the image forming surface of the sheet collides with the internal structure as described above, the developer image before fixing is disturbed by this separation discharge, and the image quality is deteriorated.

In view of the foregoing, an aspect of an object of this disclosure is to provide an image forming apparatus configured to effectively suppress deterioration of image quality due to the separation discharge.

Hereinafter, an aspect of this disclosure will be described with reference to the accompanying drawings.

In the following description, an upper-lower direction is defined with reference to the state of FIG. 1 in which an image forming apparatus 1 is placed to be usable. A front-rear direction is defined assuming that a follow roller 18 is located at the front side of a drive roller 17 in FIG. 1. A left-right direction is defined when the image forming apparatus 1 is viewed from the front. The upper-lower direction, the front-rear direction, and the left-right direction are perpendicular to each other. In the present embodiment, the upper-lower direction is an example of a vertical direction, the front-rear direction and the left-right direction are examples of a horizontal direction, and the left-right direction is an example of a width direction.

The image forming apparatus 1 is a color printer, and includes a housing 2 having an opening 5 located at the upper side, a top cover 6 for opening and closing the opening 5, an image forming unit 11 for forming an image on a sheet, a feeder unit 4, a transfer unit 13, and a fixing device 50.

The top cover 6 is supported by the housing 2 so as to be swingable about the rear end thereof. A sheet discharge tray 3 is arranged at the upper surface of the top cover 6. The sheet discharge tray 3 supports a sheet that has been printed and discharged from a sheet discharge opening 57.

The image forming unit 11 is accommodated inside the housing 2 and forms an image on a sheet. The feeder unit 4 is configured to supply a sheet to the image forming unit 11. The transfer unit 13 supplies the sheet supplied from the feeder unit 4 to the image forming unit 11. The fixing device 50 fixes an image formed on the sheet by the image forming unit 11 to the sheet.

In the image forming apparatus 1, an intermediate conveyance roller 55 and a discharge chute (not shown) arranged downstream of the fixing device 50 change the conveyance direction of the sheet for which image formation is finished upward approximately 180 degrees, and then the sheet is discharged from the sheet discharge opening 57 to the sheet discharge tray 3 by a discharge roller 56.

<Feeder Unit 4>

As shown in FIG. 1, the feeder unit 4 includes a sheet feed tray 7, a pickup roller 8, a pair of sheet feed rollers 9, and a pair of registration rollers 10. The feeder unit 4 causes the sheet placed on the sheet feed tray 7 to make a U-turn at the front side in the housing 2 and conveys the sheet to the image forming unit 11 located at a substantially center in the housing 2 in the front-rear direction.

The sheet feed tray 7 is accommodated in the lowermost part of the housing 2. The sheet feed tray 7 supports a plurality of sheets and is attachable to and detachable from the housing 2. The pickup roller 8 is arranged above the front end portion of the sheet feed tray 7, and feeds the sheet placed on the sheet feed tray 7 toward the sheet feed rollers 9. The pair of sheet feed rollers 9 are located downstream of the pickup roller 8 in the conveyance direction, and feed the sheets sent out from the sheet feed tray 7 by the pickup roller 8 in the conveyance direction. The pair of registration rollers 10 are located downstream of the sheet feed rollers 9 in the conveyance direction, and convey the sheet fed by the sheet feed rollers 9 toward the image forming unit 11. The leading end of the sheet conveyed to the registration rollers 10 abuts against the nip of the pair of registration rollers 10, thereby skew is corrected.

The image forming apparatus 1 is configured to form an image on a plurality of types of sheets having different thicknesses, rigidity, or sizes. The sheet types are mainly classified into a thin sheet (for example, thin paper) having small thickness, and a thick sheet (for example, thick paper) which is thicker than a thin sheet. A thick sheet is stiffer than a thin sheet because the thick sheet has a higher rigidity. In addition, many thick sheets are generally shorter in the width direction than thin sheets. Examples of a thin sheet include an A4 size sheet of 210 mm×297 mm and a letter size sheet of 216 mm×279 mm as an example of the size. Examples of a thick sheet include a postcard-sized sheet having a size of 100 mm×148 mm, and glossy paper whose image forming surface is coated with a glossy layer. In the following description, the thick sheet is referred to as a thick sheet S1, and the thin sheet is referred to as a thin sheet S2. The thick sheet S1 is an example of a sheet having a first width of this disclosure, and the thin sheet S2 is an example of a sheet having a second width of this disclosure.

<Image Forming Unit 11>

As shown in FIG. 1, the image forming unit 11 includes four process units 24 and four LED arrays 12. The process units 24 are detachably arranged in the housing 2 through the opening 5. The process units 24 are a so-called direct tandem system for performing color printing, and each process unit 24 includes a development cartridge 25 and a drum unit 22.

<Development Cartridge 25>

As shown in FIG. 1, the four development cartridges 25 are arranged to correspond to developer (toner) of the four colors of black, yellow, magenta, and cyan in order from the upstream side of the conveyance direction of the sheet. The four development cartridges 25K, 25Y, 25M, and 25C are arranged at intervals along the conveyance direction of the sheet. The development cartridge 25 supplies a developer image of each color to a photosensitive drum 15.

The development cartridge 25 is detachably supported by the drum unit 22, and are replaced by a user, for example.

The development cartridge 25 includes a developer storage chamber 27 storing developer (toner), an agitator 23, a supply roller 28, a development roller 16, and a layer thickness regulating blade 29.

The agitator 23 is arranged in the developer storage chamber 27. The agitator 23 conveys the developer stored in the developer storage chamber 27 to the supply roller 28 by its rotation.

The supply roller 28 supplies the developer conveyed by the agitator 23 to the development roller 16 by its rotation. The development roller 16 bears the developer supplied from the supply roller 28 on the surface. The surface of the development roller 16 is in contact with the surface of the photosensitive drum 15, and the development roller 16 supplies the developer borne on the surface of the development roller 16 to the surface of the photosensitive drum 15 by its rotation. The layer thickness regulating blade 29 adjusts the thickness of the developer borne on the surface of the development roller 16 to be uniform at a particular thickness. The layer thickness regulating blade 29 protrudes from diagonally above and rear of the development roller 16 toward the development roller 16, and its tip end is in contact with the surface of the development roller 16.

<Drum Unit 22>

The drum unit 22 is detachably arranged in the housing 2. The drum unit 22 includes the photosensitive drum 15, a charger 26, and a drum frame 30 that supports the photosensitive drum 15.

The photosensitive drum 15 bears an image to be transferred to a sheet. The photosensitive drum 15 is a cylindrical photosensitive member whose outermost layer is formed by a positively charged photosensitive layer made of polycarbonate and so on. The photosensitive drum 15 transfers an electrostatic latent image formed on its surface by contacting the sheet. The photosensitive drum 15 is arranged above the transfer unit 13, and its surface faces a conveyance surface 19B of an endless belt 19.

The charger 26 charges the surface of the photosensitive drum 15. The charger 26 faces the surface of the photosensitive drum 15 at a particular interval so as not to contact the photosensitive drum 15 diagonally above and rear of the photosensitive drum 15.

The charger 26 is a scorotron type charger that charges the surface of the photosensitive drum 15 with a positive charge substantially uniformly by performing a corona discharge from a charging wire made of tungsten and so on.

<LED Array 12>

The LED array 12 is provided with a plurality of LEDs at its tip end. The LED array 12 is held by the top cover 6 so as to be suspended from the top cover 6. In a state where the top cover 6 is closed, the LED array 12 is located above the photosensitive drum 15 to face the surface of the photosensitive drum 15. Specifically, by opening and closing of the top cover 6, the LED array 12 moves between an exposure position where the photosensitive drum 15 is exposed and a retracted position which is separated upward from the exposure position.

The LED array 12 exposes the surface of the corresponding photosensitive drum 15 by blinking a plurality of LEDs based on image data, thereby forming an electrostatic latent image on the surface.

<Transfer Unit 13>

Figure 2:
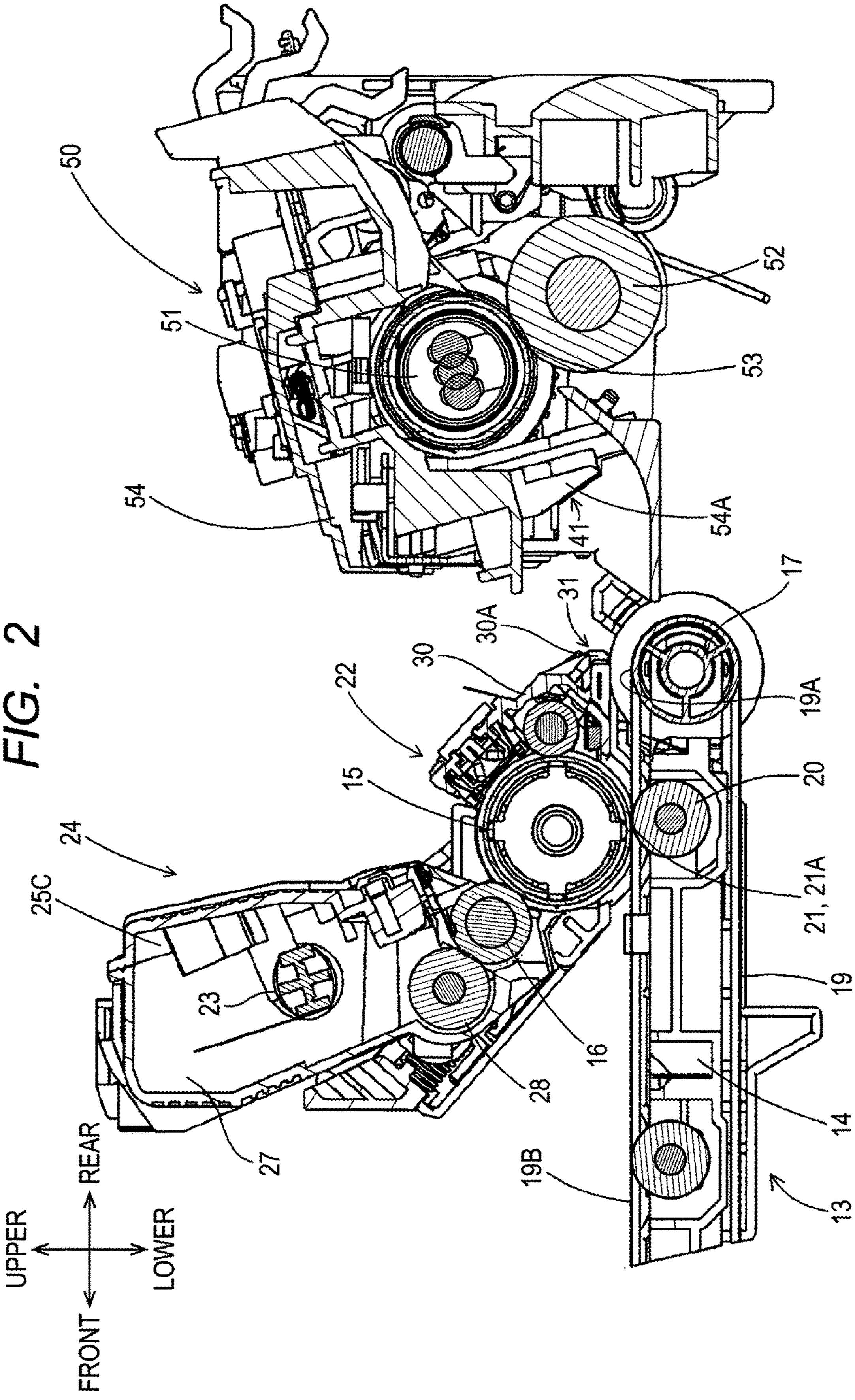
FIG. 2 is a schematic vertical cross-sectional view showing the vicinity of a drum unit 22 and a fixing device 50.

The transfer units 13 is detachably arranged in the housing 2. As shown in FIGS. 1 and 2, the transfer unit 13 includes the drive roller 17, the follow roller 18, the endless belt 19, transfer rollers 20, and a belt frame 14.

The drive roller 17 rotates by receiving driving force from a motor (not shown). The follow roller 18 is rotatably arranged at a position separated forward of the drive roller 17. The endless belt 19 is stretched so as to bridge between the drive roller 17 and the follow roller 18. The endless belt 19 circularly moves along with the drive roller 17 and the follow roller 18 as the drive roller 17 rotates. The belt frame 14 supports the drive roller 17, the follow roller 18, the endless belt 19 and the transfer rollers 20. The drive roller 17 and the follow roller 18 are examples of a plurality of rollers in this disclosure.

As shown in FIG. 2, the endless belt 19 has the conveyance surface 19B. The conveyance surface 19B is the upper surface of the outer surface of the endless belt 19 that supports a sheet from below. The transfer unit 13 conveys the sheet conveyed from the feeder unit 4 toward the fixing device 50 in a state where the sheet is placed on the conveyance surface 19B of the endless belt 19.

Each transfer roller 20 is arranged so as to face the photosensitive drum 15 in the upper-lower direction with the endless belt 19 interposed therebetween. As shown in FIG. 2, the transfer roller 20 sandwiches the endless belt 19 with the photosensitive drum 15 to form a transfer nip 21 at a position where the photosensitive drum 15 and the endless belt 19 contact each other. The photosensitive drum 15 and the transfer roller 20 sandwich the sheet and are in pressure contact with the sheet at the transfer nip 21. The transfer roller 20 applies a voltage having a polarity opposite to the charge charged on the photosensitive drum 15 to the sheet from the opposite side of the image forming surface in the transfer nip 21, so that the developer adhering to the surface of the photosensitive drum 15 is transferred to the image forming surface of the sheet.

The axial direction of the rotational axis of the photosensitive drum 15 and the transfer roller 20 is perpendicular to the conveyance direction of the sheet and to the thickness direction of the sheet that is conveyed. Thus, the photosensitive drums 15 and the transfer rollers 20 are arranged along the direction perpendicular to the rotational axis thereof.

<Fixing Device 50>

The fixing device 50 heats and melts developer transferred to the sheet discharged from the image forming unit 11 to thermally fix the developer to the sheet. The fixing device 50 is arranged downstream of the drum unit 22 in the conveyance direction of the sheet. The fixing device 50 is detachably attached to the housing 2.

The fixing device 50 includes a heat roller 51, a pressure roller 52, and a fixing frame 54. The heat roller 51 is arranged above the image forming surface of the sheet supported by the conveyance surface 19B of the endless belt 19. The heat roller 51 applies a conveying force to the sheet while heating the developer transferred to the sheet. The pressure roller 52 is arranged at the side opposite to the heat roller 51 with the sheet sandwiched in the upper-lower direction, and presses the sheet toward the heat roller 51. The heat roller 51 and the pressure roller 52 are pressed against each other to form a fixing nip 53, and sandwich the sheet at the fixing nip 53. The fixing device 50 applies heat to the sheet in the fixing nip 53 to melt the developer and fix the developer to the sheet. The fixing frame 54 accommodates the heat roller 51 and the pressure roller 52. As shown in FIG. 2, the fixing nip 53 is located at a higher position than the conveyance surface 19B.

<First Regulating Portion 31>

Figure 9:
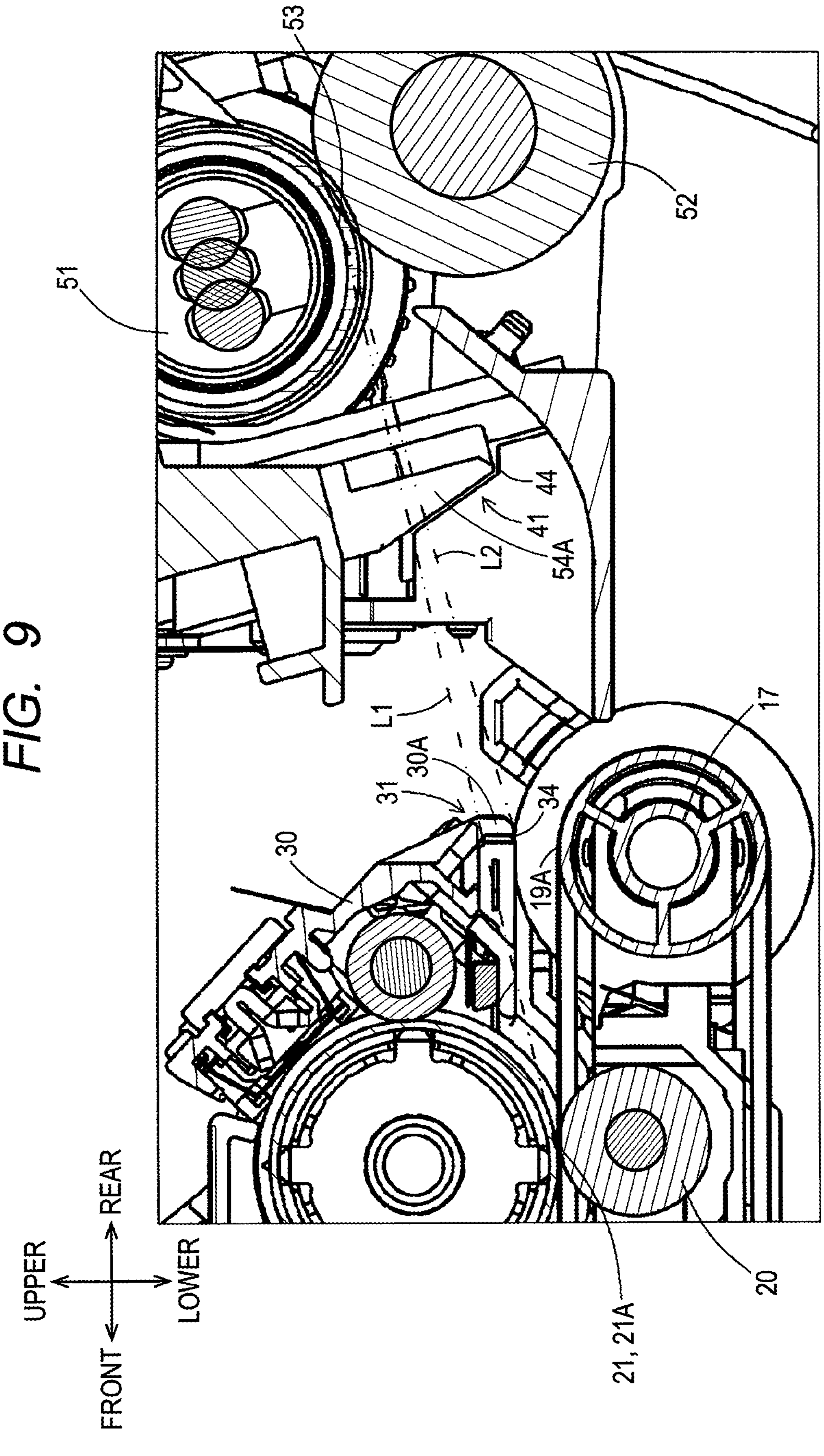
FIG. 9 is an enlarged cross-sectional view showing the vicinity of a first regulating portion 31 and a second regulating portion 41.

As shown in FIGS. 2 and 9, the drum frame 30 includes a first guide 30A configured to contact the sheet that is conveyed on the conveyance surface. The first guide 30 include a first regulating portion 31 in the center of the left-right direction. The first regulating portion 31 is located between a transfer nip 21A located most downstream in the sheet conveyance direction and one end 19A of the endless belt 19, and is located at a higher position than the endless belt 19. The first regulating portion 31 faces the conveyance surface 19B in the upper-lower direction. The one end 19A is a rear end of the endless belt 19 on the conveyance surface 19B, and is specifically located substantially directly above the rotational axis of the drive roller 17.

Figure 3:
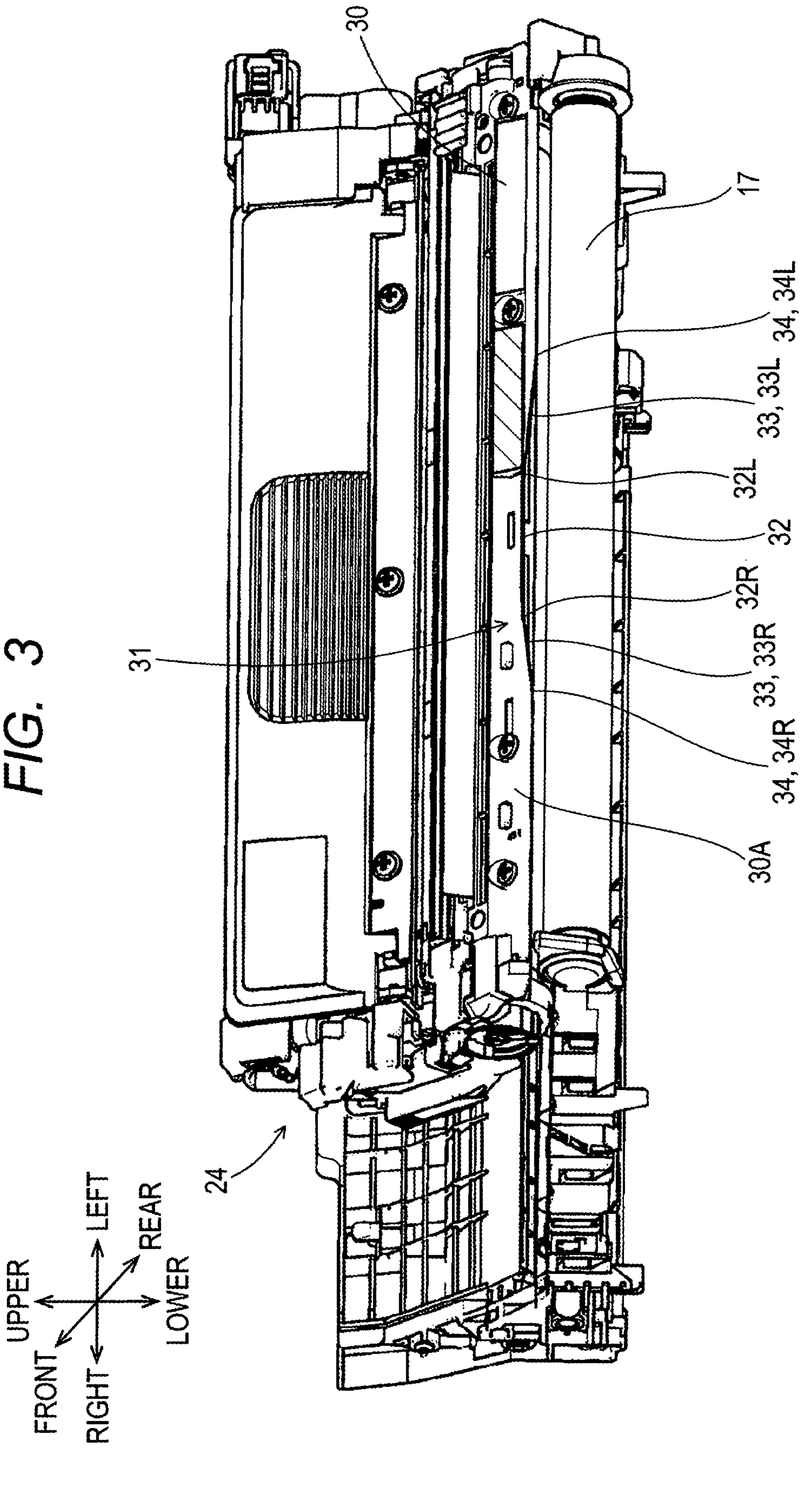
FIG. 3 is a perspective view of the drum unit 22.
Figure 5:
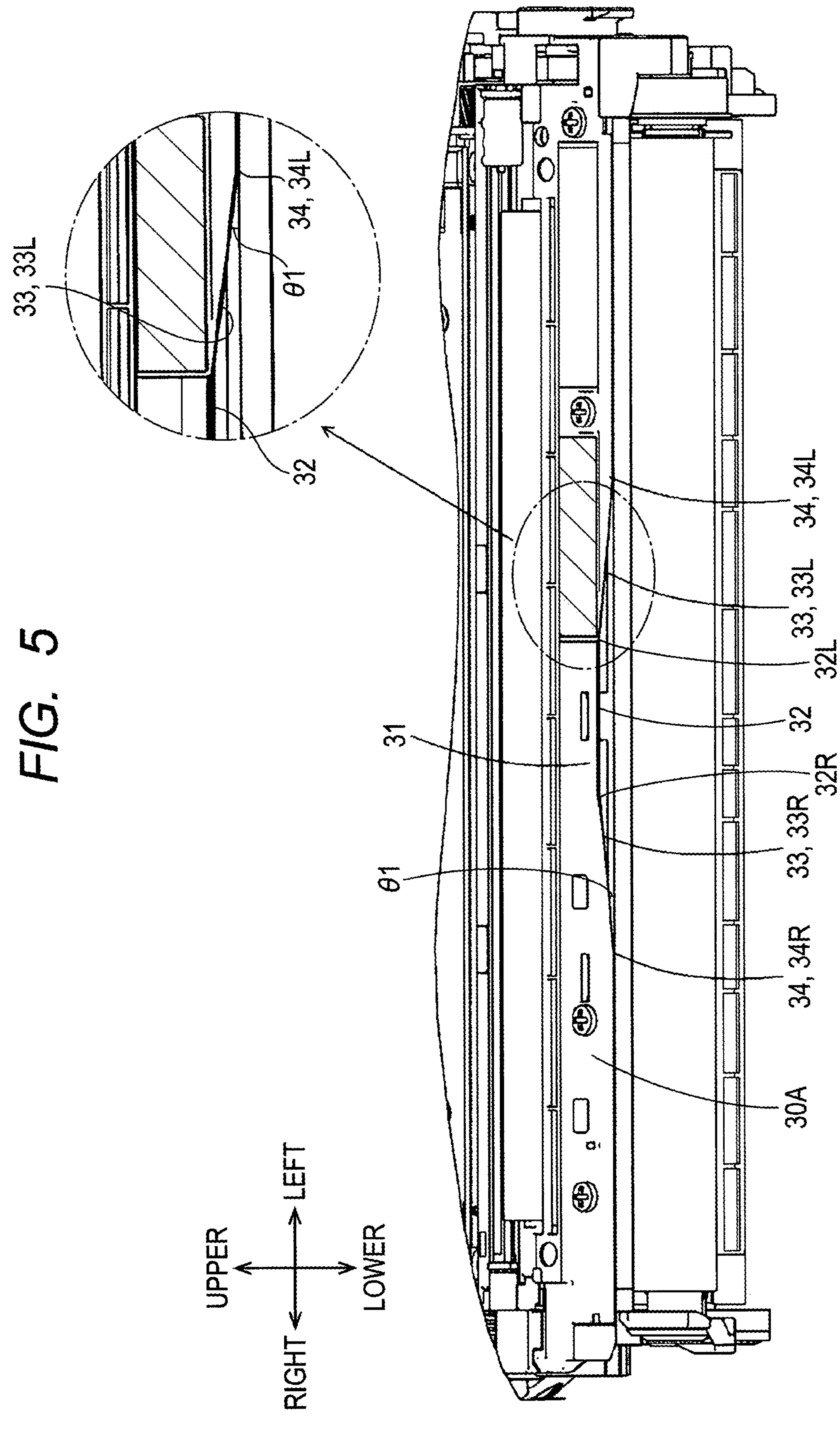
FIG. 5 is a front view of the drum unit 22 as viewed from the fixing device 50 side.

As shown in FIGS. 3 and 5, the first regulating portion 31 includes a first horizontal portion 32 and a pair of first inclined portions 33. The first horizontal portion 32 is a first horizontal surface, for example. The first horizontal portion 32 extends in the left-right direction. The pair of first inclined portions 33 is a pair of first inclined surfaces, for example. The pair of first inclined portions 33 extends from both ends 32L, 32R of the first horizontal portion 32 in the left-right direction. The pair of first inclined portions 33 is inclined to be closer to the endless belt 19 from the center toward both ends thereof in the left-right direction. Specifically, a first inclined portion 33R located at the right side of the pair of first inclined portions 33 has a left end connected to the right end 32R of the first horizontal portion 32 and is inclined to be closer to the endless belt 19 from the left end toward the right end thereof. A first inclined portion 33L located at the left side of the pair of first inclined portions 33 has a right end connected to the left end 32L of the first horizontal portion 32 and is inclined to be closer to the endless belt 19 from the right end toward the left end thereof. Lower ends 34 of the first inclined portions 33 are a right end 34R of the first inclined portion 33R and a left end 34L of the first inclined portion 33L.

As shown in FIGS. 2 and 9, a part of the pair of first inclined portions 33 is located directly above the one end 19A.

As shown in FIGS. 2 and 9, the lower end 34 of the first inclined portion 33 is located below an imaginary straight line L1 connecting the transfer nip 21A and the fixing nip 53, and is located closest to the endless belt 19 in the upper-lower direction in the first regulating portion 31.

Figure 6:
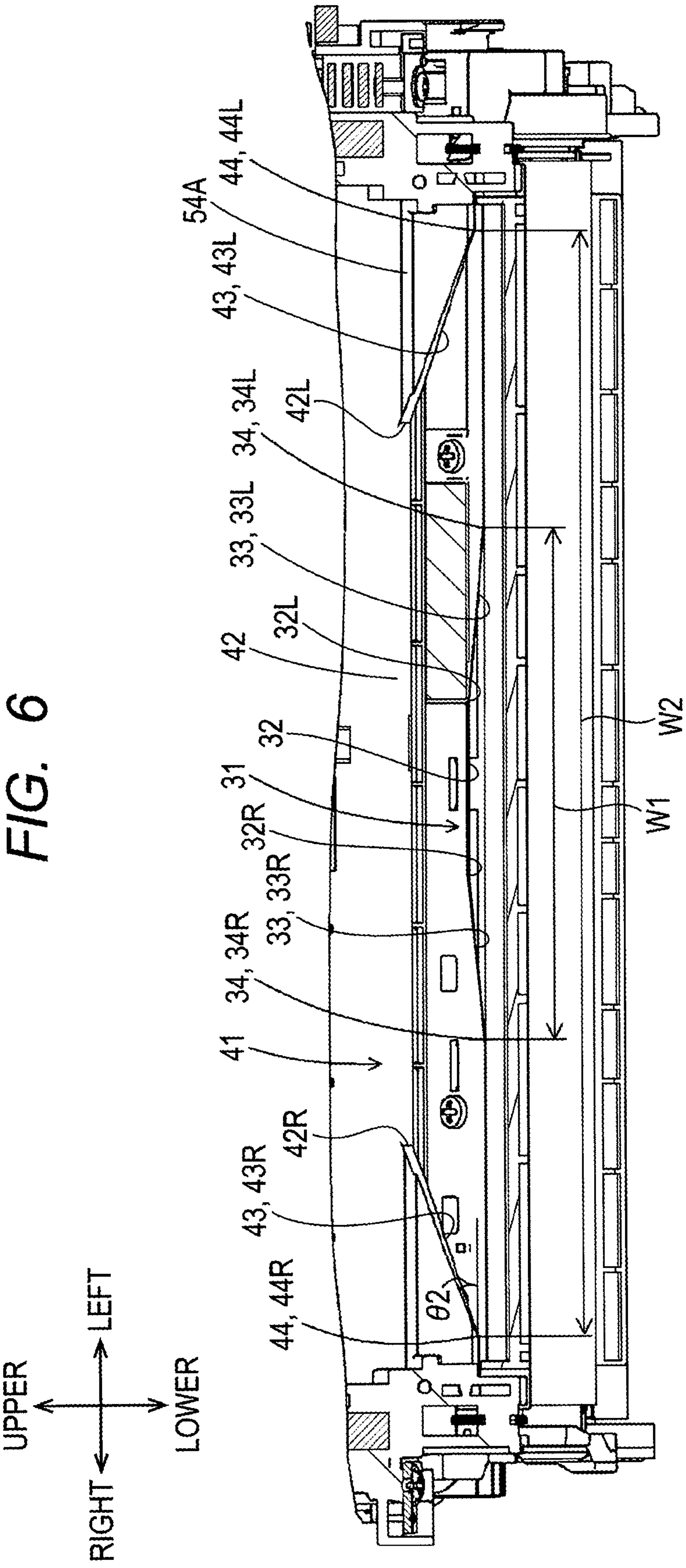
FIG. 6 is a front view of a sheet entrance of the fixing device 50 as viewed from a downstream side of a sheet conveyance path.

As shown in FIGS. 3, 5 and 6, a distance W1 in the left-right direction between the left end 34L of the first inclined portion 33L and the right end 34R of the first inclined portion 33R is larger than the width in the left-right direction of a thick sheet S1, and the size of the first horizontal portion 32 in the left-right direction is smaller than the width of the thick sheet S1. As the thick sheet S1, a postcard may be exemplified, and the width in that case is 100 mm.

The image forming apparatus 1 executes sheet conveyance according to a so-called center reference, in which the center of the sheet conveyance path in the left-right direction coincides with the center of the sheet in the left-right direction to convey the sheet. The first horizontal portion 32 is arranged at a position where the center of the sheet conveyed by the endless belt 19 in the left-right direction substantially coincides with the center of the first horizontal portion 32 in the left-right direction.

<Second Regulating Portion 41>

Figure 4:
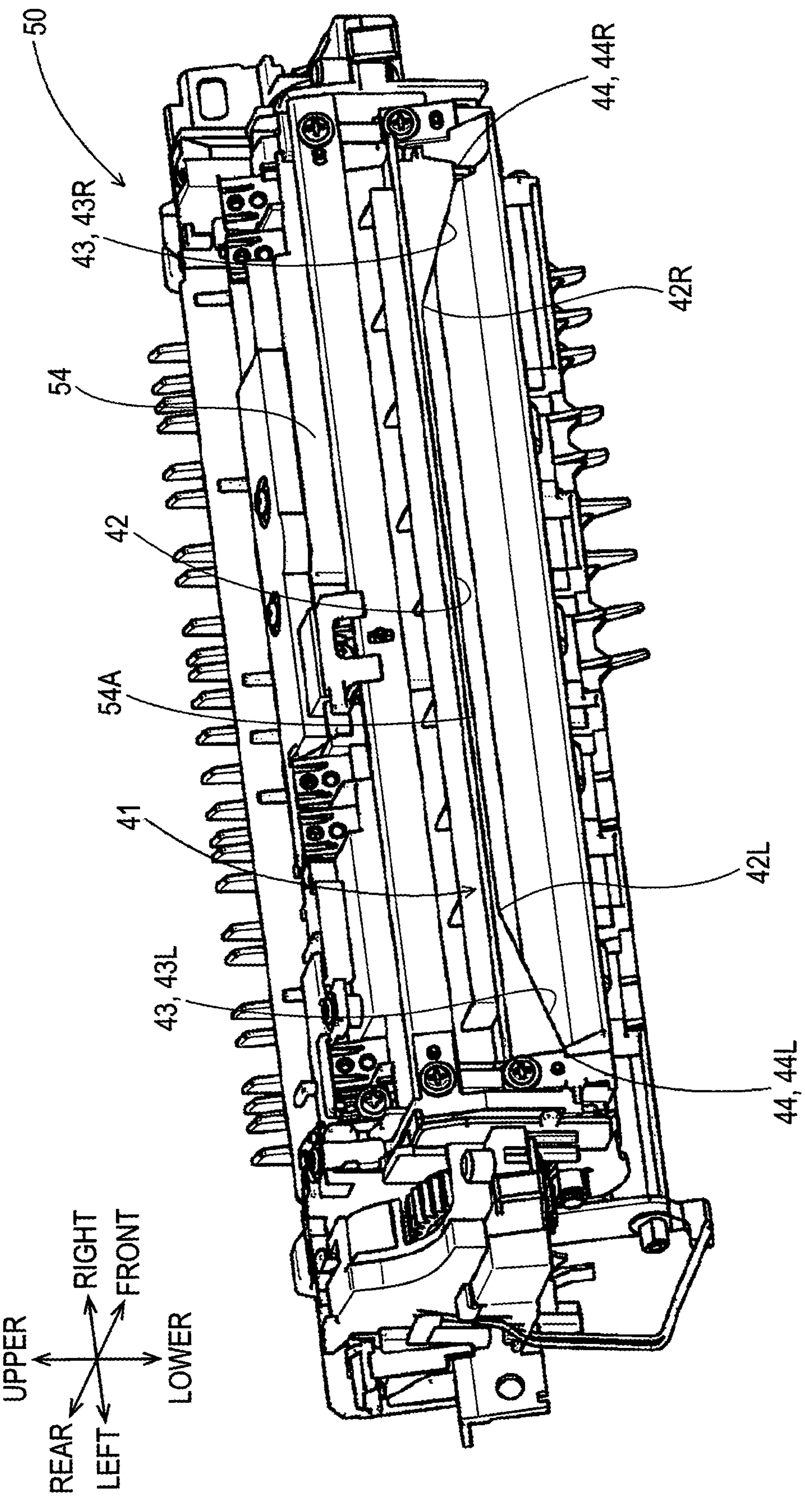
FIG. 4 is a perspective view of the fixing device 50.

As shown in FIGS. 4 and 6, the fixing frame 54 includes a second guide 54A configured to contact the sheet that is conveyed on the conveyance surface. The second guide 54A includes a second regulating portion 41 having a rib shape. The second regulating portion 41 is arranged at the entrance side of the fixing device 50, that is, above the sheet conveyance path extending from the transfer nip 21A to the fixing device 50. The second regulating portion 41 includes a second horizontal portion 42 and a pair of second inclined portions 43. The second horizontal portion 42 is a second horizontal surface, for example. The second horizontal portion 42 extends along the left-right direction. The pair of second inclined portions 43 is a pair of second inclined surfaces, for example. The pair of second inclined portions 43 extends from both ends 42L, 42R of the second horizontal portion 42 in the left-right direction. The second inclined portion 43 is inclined downward from the center toward both ends thereof in the left-right direction. Specifically, a second inclined portion 43R located at the right side of the pair of second inclined portions 43 has one end connected to the right end 42R of the second horizontal portion 42 and is inclined downward from the left end toward the right end thereof. A second inclined portion 43L located at the left side of the pair of second inclined portions 43 has a right end connected to the left end 42L of the second horizontal portion 42 and is inclined downward from the right end toward the left end thereof. Lower ends 44 (outer ends) of the second inclined portions 43 are a right end 44R of the second inclined portion 43R and a left end 44L of the second inclined portion 43L.

As shown in FIGS. 2 and 9, the lower end 44 of the second inclined portion 43 is located below an imaginary straight line L2 connecting the lower end 34 of the first inclined portion 33 and the fixing nip 53.

As shown in FIGS. 4 and 6, a distance W2 between the left end 44L of the second inclined portion 43L and the right end 44R of the second inclined portion 43R is larger than the width in the left-right direction of the thin sheet S2, and the size of the second horizontal portion 42 in the left-right direction is smaller than the width of the thin sheet S2. The size of the second horizontal portion 42 in the left-right direction is larger than the width of the thick sheet S1. The size of the second horizontal portion 42 in the left-right direction is larger than the distance W1 between the left end 34L of the first inclined portion 33L and the right end 34R of the first inclined portion 33R.

As shown in FIGS. 5 and 6, an angle θ2 formed between the second inclined portion 43 and a horizontal plane is larger than an angle θ1 formed between the first inclined portion 33 and a horizontal plane.

Operations and Effects of the Embodiment

The image forming apparatus 1 conveys the sheet on which an image is formed at the transfer nip 21A toward the fixing device 50 by the endless belt 19. The sheet takes a stable posture when the leading end and the trailing end are pinched at the fixing nip 53 and the transfer nip 21A, respectively. When the trailing end of the sheet is discharged from the transfer nip 21A, the sheet is in a state where only the leading end is pinched by the fixing nip 53. At this time, the trailing end of the sheet that is not pinched may be lifted from the conveyance surface 19B due to the impact applied to the sheet when the sheet is discharged or the force applied to the sheet at the fixing nip 53. When the trailing end of the sheet is lifted from the conveyance surface 19B in this way, a separation discharge is generated between the conveyance surface 19B and the lifted sheet, and the developer image before fixing is disturbed by the generated static electricity and its impact. This may lead to deterioration of image quality.

The pair of first inclined portions 33 of the first regulating portion 31 is arranged between the transfer nip 21A and the one end 19A of the endless belt 19 where the sheet is lifted from the endless belt 19, and faces the conveyance surface 19B from above the conveyance surface 19B.

According to this configuration, when the trailing end of the sheet is lifted from the conveyance surface 19B, the pair of first inclined portions 33 contacts both ends of the trailing end of the lifted sheet in the left-right direction and directly press the trailing end of the sheet. Thus, the lift of the trailing end of the sheet is suppressed and the separation discharge is effectively suppressed.

When the sheet discharged from the transfer nip 21A is further conveyed, the trailing end of the sheet is separated from the transfer surface 19B at the one end 19A of the endless belt 19. In this case, the trailing end of the sheet, which is not supported by the endless belt 19, may be lifted and a separation discharge may occur.

A part of the pair of first inclined portions 33 of the first regulating portion 31 is arranged at a position overlapping substantially directly above the one end 19A of the endless belt 19 in the sheet conveyance direction. In other words, the pair of first inclined portions 33 is provided at a position overlapping the rotational axis of the drive roller 17 with respect to the conveyance direction.

According to this configuration, even when the trailing end of the sheet is separated from the conveyance surface 19B, the pair of first inclined portions 33 contacts both ends in the left-right direction of the trailing end of the sheet, and directly presses the trailing end of the sheet. Thus, the lift of the trailing end of the sheet is suppressed and the separation discharge is effectively suppressed.

The pair of first inclined portions 33 is inclined so as to gradually approach the conveyance surface 19B of the endless belt 19 from the center toward both ends in the left-right direction.

According to this configuration, when the first inclined portion 33 contacts both ends in the left-right direction of the sheet, the first inclined portion 33 regulates the image forming surface in the center area of the sheet in the left-right direction from contacting the first regulating portion 31. Thus, deterioration of image quality due to rubbing of the image before fixing is suppressed.

When the fixing nip 53 is arranged at a higher position than the conveyance surface 19B of the endless belt 19, a separation discharge due to lift of the trailing end of the sheet is likely to occur noticeably when forming an image on a sheet having high rigidity and strong stiffness such as a thick sheet. A sheet with strong stiffness bridges between the transfer nip 21A and the fixing nip 53 in a substantially straight line without bending like a thin sheet, so that the sheet is greatly inclined relative to the conveyance surface 19B and the trailing end of the sheet is likely to be lifted. When the trailing end of the sheet is greatly lifted in this way, the impact due to the separation discharge is increased, so that there is a high possibility that the image quality will be significantly deteriorated due to the separation discharge, particularly in a sheet with strong stiffness. In the present embodiment, the thick sheet S1 is used as an example of a sheet having strong stiffness.

In the present embodiment, the distance W1 in the left-right direction between the left end 34L of the first inclined portion 33L and the right end 34R of the first inclined portion 33R is larger than the width in the left-right direction of the thick sheet S1, and the size of the first horizontal portion 32 in the left-right direction is smaller than the width of the thick sheet S1.

According to this configuration, the first inclined portion 33 contacts both ends of the thick sheet S1 in the left-right direction and suppresses the lift of the trailing end of the thick sheet S1 to effectively suppress the separation discharge.

As shown in FIG. 9, the lower end 34 of the first inclined portion 33 is arranged below the imaginary straight line L1 connecting the transfer nip 21A and the fixing nip 53.

Figure 7:
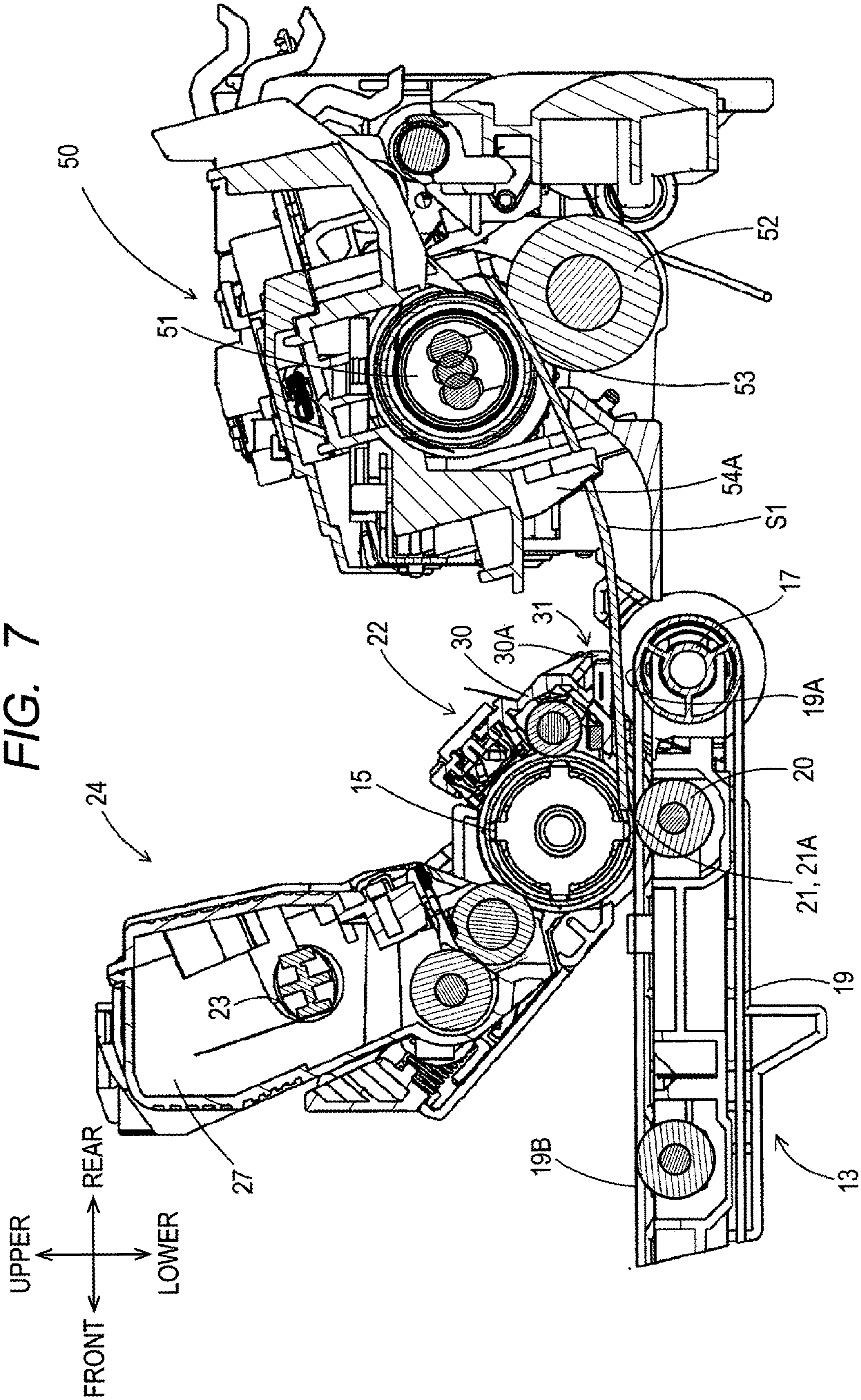
FIG. 7 is a vertical cross-sectional view showing a state where a thick sheet S1 is conveyed from an image forming unit 11 to the fixing device 50.

As shown in FIG. 7, when the first inclined portion 33 contacts the thick sheet S1, the first regulating portion 31 prevents the thick sheet S1 from bridging between the transfer nip 21A and the fixing nip 53 in a straight line, so that the thick sheet S1 bends. When the thick sheet S1 bends, the impact when the trailing end of the thick sheet S1 is lifted is reduced, and the separation discharge is further suppressed.

The first regulating portion 31 is arranged in the drum unit 22 which is in contact with the transfer unit 13 in the transfer nip 21A.

According to this configuration, the first regulating unit 31 is accurately positioned with respect to the conveyance surface 19B of the endless belt 19. As a result, when the trailing end of the sheet is lifted, the first inclined portion 33 accurately contacts both ends of the sheet in the left-right direction, thereby effectively suppressing the separation discharge.

When the sheet conveyed by the endless belt 19 is the thin sheet S2 having a larger width in the left-right direction than the distance W1 in the left-right direction between the right end 34R of the first inclined portion 33R and the left end 34L of the first inclined portion 33L, the first regulating portion 31 may contact the image forming surface of the thin sheet S2 when the thin sheet S2 is lifted from the conveyance surface 19B of the endless belt 19. Thus, rubbing may occur in the image before fixing.

Therefore, in the present embodiment, the lower end 44 of the second inclined portion 43 is arranged below the imaginary straight line L2 connecting the lower end 34 of the first inclined portion 33 and the fixing nip 53.

Figure 8:
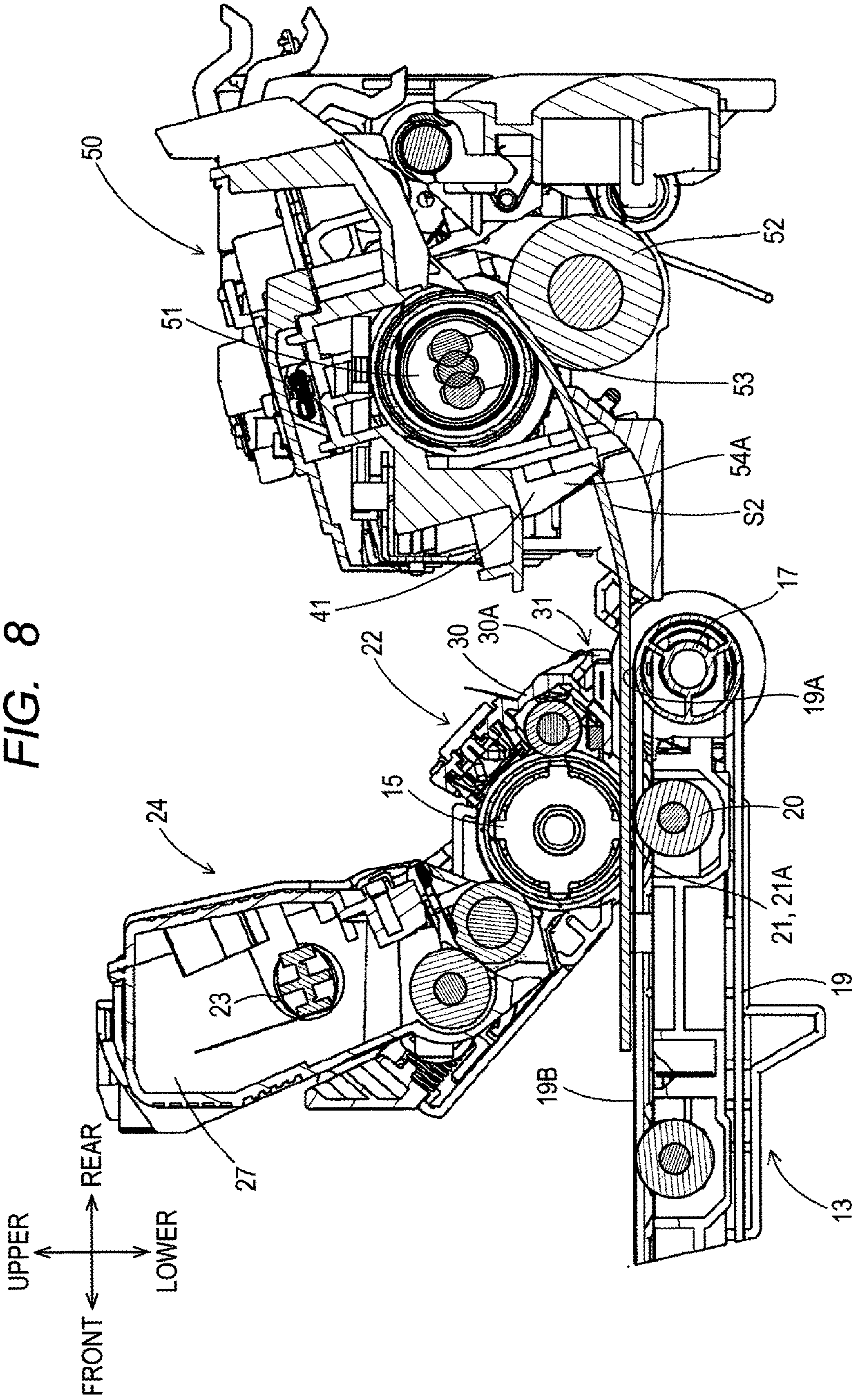
FIG. 8 is a vertical cross-sectional view showing a state where a thin sheet S2 is conveyed from the image forming unit 11 to the fixing device 50.

As shown in FIG. 8, the second inclined portion 43 contacts the thin sheet S2 before the image forming surface of the thin sheet S2 contacts the first inclined portion 33. As a result, the second regulating portion 41 regulates the lift of the thin sheet S2 to suppress the separation discharge, and regulates the image forming surface of the thin sheet S2 from contacting the first regulating portion 31. Thus, deterioration of image quality due to rubbing of the image before fixing is suppressed.

As shown in FIG. 9, the lower end 44 of the second inclined portion 43 is located below the imaginary straight line L2 connecting the lower end 34 of the first inclined portion 33 and the fixing nip 53. That is, the lower end 44 of the second inclined portion 43 is arranged below the imaginary straight line L1 connecting the transfer nip 21A and the fixing nip 53.

According to this configuration, as shown in FIG. 8, when the thin sheet S2 contacts the second inclined portion 43, the second regulating portion 41 prevents the thin sheet S2 from bridging between the transfer nip 21A and the fixing nip 53 in a straight line, so that the thin sheet S2 bends. When the thin sheet S2 bends, the impact when the trailing end of the thin sheet S2 is lifted is reduced, and the separation discharge is further suppressed.

The second inclined portion 43 is inclined downward as it advances from the center toward both ends in the left-right direction.

According to this configuration, when the second inclined portion 43 contacts both ends of the sheet in the left-right direction, the second inclined portion 43 regulates the image forming surface on the center area of the sheet in the left-right direction from contacting the second regulating portion 41, thereby suppressing deterioration of image quality due to rubbing of the image before fixing.

As shown in FIGS. 5 and 6, the angle θ2 between the second inclined portion 43 and the horizontal plane is larger than the angle θ1 between the first inclined portion 33 and the horizontal plane.

According to this configuration, the pair of second inclined portions 43 expands the space between the left and right inclined portions 43L and 43R. This regulates the image forming surface of the thick sheet S1 conveyed to the fixing device 50 through the space from contacting the second regulating portion 41.

When the sheet is curved in an upward convex direction, the image forming surface on the center area in the left-right direction of the sheet may contact the second regulating portion 41 even if the second inclined portion 43 contacts both ends of the sheet in the left-right direction. The thin sheet S2 is weaker in stiffness than the thick sheet S1 and tends to be easily curved.

Since the angle θ2 between the second inclined portion 43 and the horizontal plane is larger than the angle θ1, even if the thin sheet S2 is curved in the upward convex direction, the second inclined portion 43 further regulates the image forming surface of the thin sheet S2 from contacting the second regulating portion 41, thereby suppressing deterioration of image quality due to rubbing of the image before fixing.

While the disclosure has been described in detail with reference to the above aspects thereof, it would be apparent to those skilled in the art that various changes and modifications may be made therein without departing from the scope of the claims.

For example, in the above embodiment, the first regulating portion 31 is provided at the drum frame 30, but is not limited to this configuration. For example, the first regulating portion 31 may be provided at the belt frame 14 of the transfer unit 13. In this case, since the endless belt 19 for conveying a sheet and the first regulating portion 31 are both supported by the belt frame 14, the first regulating portion 31 is accurately positioned relative to the conveyance surface 19B. Thus, when the trailing end of the sheet is lifted, the first inclined portion more accurately contacts both ends in the width direction of the trailing end of the sheet.

The first inclined portion 33 is not limited to the shape of the above-described embodiment, as long as the first inclined portion 33 is inclined in a direction approaching the conveyance surface 19B from the center toward both ends in the left-right direction. Further, the shapes of the left and right first inclined portions 33L and 33R do not have to be the same.

The second inclined portion 43 is not limited to the shape of the above-described embodiment, as long as the second inclined portion 43 is inclined downward from the center toward both ends in the width direction. Further, the shapes of the left and right second inclined portions 43L and 43R do not have to be the same.

In the above embodiment, the exposure device using an LED is exemplified as the LED array 12, but this disclosure is not limited to this. For example, the exposure device may be an exposure device including a laser light source, a polygon mirror, an ID lens, a reflecting mirror, and so on. In this case, a laser beam is emitted from the laser light source based on image data. The laser beam is deflected by the polygon mirror, passes through the ID lens, and then the optical path is changed by the reflecting mirror, and the optical path is further bent downward by the reflecting mirror, so that the laser beam is irradiated on the surface of the photosensitive drum 15 and an electrostatic latent image is formed on the photosensitive drum 15.

In the above embodiment, the fixing device 50 having the heat roller 51 and the pressure roller 52 is exemplified as the fixing device, but this disclosure is not limited this configuration. For example, the fixing device may be a fixing device provided with a heating unit having an endless belt and a nip member arranged inside the endless belt and sandwiches the endless belt with the pressure roller 52, and so on.

In the above embodiment, the image forming apparatus 1 that forms a color image is exemplified, but this disclosure is not limited to this. For example, the image forming apparatus 1 may be an image forming apparatus that forms a monochrome image. Further, the image forming apparatus 1 may be a copying machine or a multifunction peripheral provided with a document scanner such as a flatbed scanner, and so on, in addition to a laser printer.

What is claimed is:

1. An image forming apparatus comprising:

a transfer unit including:
- a plurality of rollers; and
- an endless belt stretched between the plurality of rollers and configured to convey a sheet in a conveyance direction, an upper surface of the endless belt serving as a conveyance surface; and a process unit including:
- a photosensitive drum provided above the endless belt in a gravitational direction, the process unit being configured to form an image on the sheet at a transfer nip between the photosensitive drum and the endless belt; and
- a drum frame supporting the photosensitive drum, the drum frame including a first regulating portion located between the transfer nip and a downstream end of the conveyance surface in the conveyance direction, the first regulating portion facing the conveyance surface from above the conveyance surface in the gravitational direction, the first regulating portion being configured to contact the sheet that is conveyed on the conveyance surface,
- the first regulating portion is a plate-like member including:
  - a first horizontal portion extending in a width direction perpendicular to the conveyance direction; and
  - a pair of first inclined portions extending from both ends of the first horizontal portion in the width direction, each of the pair of first inclined portions having one end adjacent to the first horizontal portion and an other end away from the one end in the width direction, each of the pair of first inclined portions being inclined to be closer to the endless belt from the one end toward the other end, the pair of first inclined portions being configured to contact both ends of the sheet in the width direction, wherein the image forming apparatus is configured to form an image on a sheet having a first width in the width direction and on a sheet having a second width greater than the first width;

wherein a distance between the other end of each of the pair of first inclined portions in the width direction is larger than the first width;

wherein a size of the first horizontal portion in the width direction is smaller than the first width;

wherein the image forming apparatus further comprises:
- a fixing device configured to thermally fix an image formed on the sheet, the fixing device including a heat roller and a pressure roller in contact with the heat roller to form a fixing nip for nipping the sheet; and a second regulating portion provided between the first regulating portion and the fixing nip in the conveyance direction in a conveyance path of the sheet;

wherein the second regulating portion includes:

a second horizontal portion extending in the width direction; and a pair of second inclined portions extending from both ends of the second horizontal portion in the width direction, each of the pair of second inclined portions having an inner end adjacent to the second horizontal portion and an outer end away from the inner end in the width direction, each of the pair of second inclined portions being inclined downward from the inner end toward the outer end, the pair of second inclined portions being configured to contact both ends of the sheet in the width direction, wherein a distance between the outer end of each of the pair of second inclined portions in the width direction is larger than the second width;

wherein a size of the second horizontal portion in the width direction is smaller than the second width; and wherein the size of the second horizontal portion in the width direction is larger than the distance between the other end of each of the pair of first inclined portions in the width direction.

2. The image forming apparatus according to claim 1, wherein the pair of first inclined portions is provided at a position overlapping a rotational axis of a downstream roller with respect to the conveyance direction when viewed from the gravitational direction, the downstream roller being one of the plurality of rollers located most downstream in the conveyance direction.

3. The image forming apparatus according to claim 1, wherein the other end of each of the pair of first inclined portions is located below an imaginary straight line connecting the fixing nip and the transfer nip in the gravitational direction.

4. The image forming apparatus according to claim 1, wherein the other end of each of the pair of second inclined portions is located below an imaginary straight line connecting the fixing nip and a lower end of each of the pair of first inclined portions in the gravitational direction.

5. The image forming apparatus according to claim 1, wherein an angle formed between a horizontal plane and each of the pair of second inclined portions is larger than an angle formed between another horizontal plane and each of the pair of first inclined portions.

6. The image forming apparatus according to claim 1, wherein the fixing device further includes a fixing frame accommodating the heat roller and the pressure roller; and wherein the fixing frame includes the second regulating portion.

7. The image forming apparatus according to claim 1, wherein the first width is 100 mm.

8. The image forming apparatus according to claim 1, wherein the second width is 216 mm.

9. The image forming apparatus according to claim 1, further comprising a housing having an opening, wherein the process unit is detachably arranged in the housing through the opening.

10. An image forming apparatus comprising:

a plurality of rollers;

an endless belt stretched between the plurality of rollers and configured to convey a sheet in a conveyance direction, an upper surface of the endless belt serving as a conveyance surface;

a photosensitive drum provided above the endless belt in a gravitational direction;

a transfer roller configured to form an image on the sheet at a transfer nip between the photosensitive drum and the endless belt; and a drum frame supporting the photosensitive drum, the drum frame including a first guide located between the transfer nip and a downstream end of the conveyance surface in the conveyance direction, the first guide facing the conveyance surface from above the conveyance surface in the gravitational direction, the first guide being configured to contact the sheet that is conveyed on the conveyance surface, the first guide is a plate-like member including:

a first horizontal surface extending in a width direction perpendicular to the conveyance direction; and a pair of first inclined surfaces extending from both ends of the first horizontal surface in the width direction, each of the pair of first inclined surfaces having one end adjacent to the first horizontal surface and an other end away from the one end in the width direction, each of the pair of first inclined surfaces being inclined to be closer to the endless belt from the one end toward the other end, the pair of first inclined surfaces being configured to contact both ends of the sheet in the width direction, wherein the image forming apparatus is configured to form an image on a sheet having a first width in the width direction and on a sheet having a second width greater than the first width;

wherein a distance between the other end of each of the pair of first inclined surfaces in the width direction is larger than the first width;

wherein a size of the first horizontal surface in the width direction is smaller than the first width;

wherein the image forming apparatus further comprises:

a fixing device configured to thermally fix an image formed on the sheet, the fixing device including a heat roller and a pressure roller in contact with the heat roller to form a fixing nip for nipping the sheet, the fixing device including a second guide located between the first guide and the fixing nip in the conveyance direction in a conveyance path of the sheet;

wherein the second guide includes:

a second horizontal surface extending in the width direction; and a pair of second inclined surfaces extending from both ends of the second horizontal surface in the width direction, each of the pair of second inclined surfaces having an inner end adjacent to the second horizontal surface and an outer end away from the inner end in the width direction, each of the pair of second inclined surfaces being inclined downward from the inner end toward the outer end, the pair of second inclined surfaces being configured to contact both ends of the sheet in the width direction, wherein a distance between the outer end of each of the pair of second inclined surfaces in the width direction is larger than the second width;

wherein a size of the second horizontal surface in the width direction is smaller than the second width; and wherein the size of the second horizontal surface in the width direction is larger than the distance between the other end of each of the pair of first inclined surfaces in the width direction.

11. The image forming apparatus according to claim 10, wherein the pair of first inclined surfaces is provided at a position overlapping a rotational axis of a downstream roller with respect to the conveyance direction when viewed from the gravitational direction, the downstream roller being one of the plurality of rollers located most downstream in the conveyance direction.

12. The image forming apparatus according to claim 10, wherein the other end of each of the pair of first inclined surfaces is located below an imaginary straight line connecting the fixing nip and the transfer nip in the gravitational direction.

13. The image forming apparatus according to claim 10, wherein the other end of each of the pair of second inclined surfaces is located below an imaginary straight line connecting the fixing nip and a lower end of each of the pair of first inclined surfaces in the gravitational direction.

14. The image forming apparatus according to claim 10, wherein an angle formed between a horizontal plane and each of the pair of second inclined surfaces is larger than an angle formed between another horizontal plane and each of the pair of first inclined surfaces.

15. The image forming apparatus according to claim 10, wherein the fixing device further includes a fixing frame accommodating the heat roller and the pressure roller; and wherein the fixing frame includes the second guide.

16. The image forming apparatus according to claim 10, wherein the first width is 100 mm.

17. The image forming apparatus according to claim 10, wherein the second width is 216 mm.

* * * * *